（12）United States Patent
Polehn

(10) Patent No.: US 8,977,785 B2
(45) Date of Patent: Mar. 10, 2015

(54) MACHINE TO MACHINE DEVELOPMENT ENVIRONMENT

(71) Applicant: Cellco Partnership, Basking Ridge, NJ (US)

(72) Inventor: Donna L. Polehn, Kirkland, WA (US)

(73) Assignee: Cellco Partnership, Basking Ridge, NJ (US)

( * ) Notice: Subject to any disclaimer, the term of this patent is extended or adjusted under 35 U.S.C. 154(b) by 22 days.

(21) Appl. No.: 13/675,495

(22) Filed: Nov. 13, 2012

(65) Prior Publication Data

US 2014/0136735 A1    May 15, 2014

(51) Int. Cl.
*G06F 3/00*     (2006.01)
*G06F 13/00*    (2006.01)
*G06F 15/173*   (2006.01)
*G06F 13/32*    (2006.01)

(52) U.S. Cl.
CPC ..................................... *G06F 13/32* (2013.01)
USPC ............. 710/22; 710/104; 709/203; 709/223; 709/224; 709/225; 709/226; 709/229

(58) Field of Classification Search
None
See application file for complete search history.

(56) References Cited

U.S. PATENT DOCUMENTS

| | | | |
|---|---|---|---|
| 7,953,893 B1* | 5/2011 | Subramanyan et al. ....... | 709/246 |
| 7,996,720 B2* | 8/2011 | Jung et al. ......................... | 714/36 |
| 2002/0091826 A1* | 7/2002 | Comeau et al. ................ | 709/226 |
| 2003/0188153 A1* | 10/2003 | Demoff et al. ................. | 713/153 |
| 2006/0129848 A1* | 6/2006 | Paksoy et al. .................. | 713/193 |
| 2009/0150721 A1* | 6/2009 | Kochar et al. ....................... | 714/6 |
| 2009/0172323 A1* | 7/2009 | Swanson et al. .............. | 711/162 |
| 2010/0189011 A1* | 7/2010 | Jing et al. ...................... | 370/254 |
| 2011/0173385 A1* | 7/2011 | Swanson et al. .............. | 711/105 |
| 2013/0290661 A1* | 10/2013 | Reuther et al. ................ | 711/162 |

* cited by examiner

*Primary Examiner* — Michael Sun

(57) ABSTRACT

A wireless memory device may include logic configured to detect that first data has been written by a microcontroller to a first address of a memory space of the wireless memory device; incorporate the first data into a first packet, in response to detecting that the first data has been written to the memory space, wherein the first packet includes the first address; and provide the first packet to a wireless chipset to wirelessly transmit the first packet to a destination device. The logic may be further configured to receive a second packet from the wireless chip set, wherein the second packet was received wirelessly from the destination device; retrieve a second memory address from the second packet; retrieve second data from the second packet; and write the second data to the retrieved second memory address in the memory space of the wireless memory device.

20 Claims, 17 Drawing Sheets

1102

MC CODE
1120
```
typedef struct windmillstatus {
        unsigned char control;
        char windmillname [80];
        int current_rpms;
        float watts;
        int alarms [8];
} wmstat;
// memory location for WiMe
Wmstat *mystatus = (wmstat *) 0x1000;
Mystatus.current_rpms = get_rpms();
```

APPLICATION CODE
1130
```
#include "wime_api"
typedef struct windmillstatus {
unsigned char control;
char windmillname [80];
Int current_rpms;
float watts;
int alarms [8];
} wmstat;
wmstat *status_mill1234 = get_wime("2067951234");
Printf("rpms for 2067951234 = %d/n", status_mill1234->current_rpms);
```

FIG. 11B

MACHINE TO MACHINE DEVELOPMENT ENVIRONMENT

BACKGROUND INFORMATION

Microcontrollers are widely used to control many kinds of electronic devices. Microcontrollers may be also used in embedded systems within electronic devices and dedicated for particular tasks. A microcontroller may receive digital input signals, process the digital input signals, and generate digital output signals based on instructions stored in a memory. In some applications, a user may not need to interact with a microcontroller. For example, the microcontroller may be programmed with instructions and may operate without the need to change the instructions or without sending or receiving data from another device. However, in many applications, a microcontroller may need to communicate with a user or with a remote device.

BRIEF DESCRIPTION OF THE DRAWINGS

FIGS. 11A-11D are diagrams of a first exemplary system according to an implementation described herein.

DETAILED DESCRIPTION OF PREFERRED EMBODIMENTS

Figure 1:
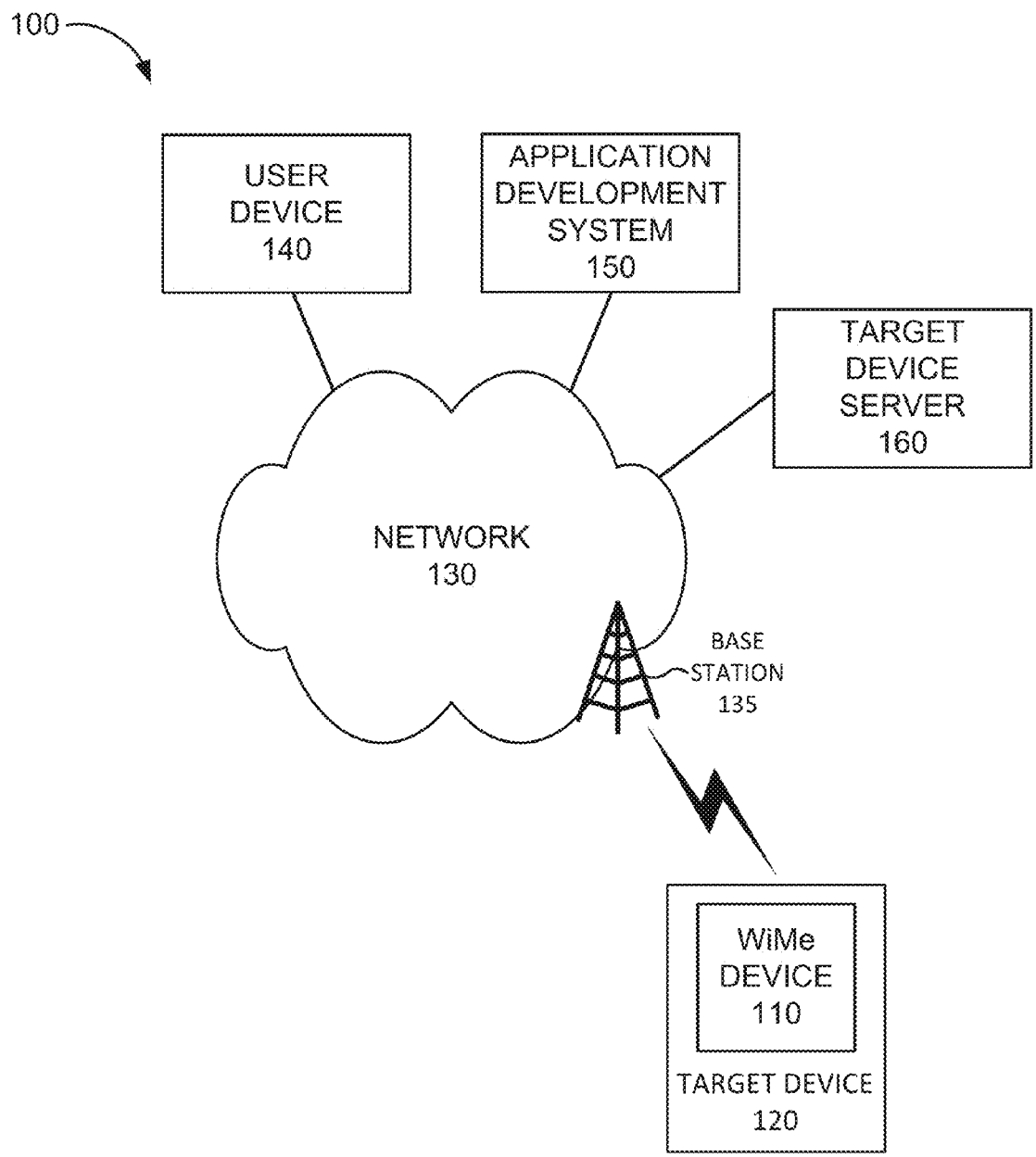
FIG. 1 is a diagram illustrating an exemplary environment according to an implementation described herein.

The following detailed description refers to the accompanying drawings. The same reference numbers in different drawings identify the same or similar elements.

An implementation described herein relates to a platform for development and deployment of machine to machine applications using a wireless network and using cloud-based resources. A target device may include a microcontroller for controlling aspects of the target device. The microcontroller may be connected to a wireless memory device/chip and the microcontroller may use the wireless memory chip as a memory chip by storing data in the wireless memory chip or by retrieving data from the wireless memory chip. The memory space of the wireless memory chip may be mirrored in the memory space of a server device in the "cloud," thereby enabling machine to machine communication between the server device and the microcontroller. A user may interact with the target device by using the mirrored memory space in the server device through a user interface. Information written to the memory space of the server device may be transmitted to the wireless memory chip using a wireless network. The wireless memory chip may be assigned a mobile device identifier, such as a telephone number, and may be treated by the wireless network as a mobile communication device.

A user may be provided with a user interface to enable the user to configure the target device by programming the microcontroller. For example, a user may specify a mobile device identifier for the wireless memory device, may specify a server device for the user application, may configure instrumentation for the target device, may configure automated processes for the target device, may configure communication for the target device, may configure logs and/or alarms, and/or may select other types of configurations for the target device. A user application may be generated based on the user's configurations. Furthermore, instructions for the microcontroller may be generated and sent to the wireless memory device.

The microcontroller may communicate with the user application through the wireless memory device. The user application may store data at a particular memory address of an application interface memory space on a server device associated with the user application. An application interface may generate a packet that includes the stored data and the memory address at which the data was stored and may send the packet to the wireless memory device. The wireless memory device may retrieve the stored data and the memory address from the packet and may store the data at the retrieved memory address in the memory space of the wireless memory device. The microcontroller may access the data in the memory space of the wireless memory device.

Similarly, the microcontroller may store data at a memory address in the wireless memory device. The wireless memory device may generate a packet that includes the stored data and the memory address at which the data was stored and may send the packet to the user application. The application interface may retrieve the stored data and the memory address from the packet and may store the data at the retrieved memory address in the application interface memory space on the server device. The user application may access the data stored in the application interface memory space.

FIG. 1 is a diagram illustrating an exemplary environment 100 according to an implementation described herein. As shown in FIG. 1, environment 100 may include a wireless memory (WiMe) device 110, a target device 120, a network 130, a user device 140, a application development system 150, and a target device server 160. While a single WiMe device 110, a single target device 120, a single network 130, a single user device 140, a single application development system 150, and a single target device server 160 are shown in FIG. 1 for illustrative purposes, in practice, environment 100 may include multiple WiMe devices 110, multiple target devices 120, multiple networks 130, multiple user devices 140, multiple application development systems 150, and/or multiple target device servers 160.

WiMe device 110 may include a wireless memory device. For example, WiMe device 110 may include a memory chip with a communication interface and an antenna, configured to communicate with network 130 using wireless signals. WiMe device 110 may be included within target device 120.

Target device 120 may include any electronic device with a microcontroller, such as a microcontroller controlling one or more actuators, a microcontroller controlling one or more sensors, a microcontroller that performs data processing, and/or another type of electronic device with a microcontroller. Examples of target device 120 may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device.

Network 130 may enable WiMe device 110, user device 140, application development system 150, and/or target device server 160 to communicate with each other. Network 130 may include one or more wired and/or wireless networks. For example, network 130 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 130 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks. Network 130 may include base station 135. Base station 135 may send wireless signals to WiMe device 110 and may receive wireless signals from WiMe device 110.

User device 140 may include any device capable of communicating with application development system 150 and/or with WiMe device 110. For example, user device 140 may include a mobile phone, a smart phone, a tablet computer, a laptop computer, a personal digital assistant (PDA), or another type of portable communication device. As another example, user device 140 may include a desktop computer, a set-top box, a telephone device with video capability, and/or another type of communication device. User device 140 may include an address book that stored information relating to business and that received updates for businesses stored in the address book.

Application development system 150 may include one or more devices, such as server devices, which provide a user interface to user device 140 to enable user device 140 to interact with target device 120 via WiMe device 110. For example, application development system 150 may provide a user interface to a browser application running on user device 140 to enable a user to configure target device 120. Application development system 150 may generate a user application based on configurations selected by the user. In some implementations, the user application may run on application development system 150. In other implementations, the user application may be provided to target device server 160 and may run on target device server 160. Target device server 160 may include one or more devices, such as server devices, which include the user application. The user application may use an application interface memory space which may be mirrored in WiMe device 110. Thus, target device server 160 may copy data from the application interface memory space to a memory space in WiMe device 110 and WiMe device 110 may copy data from the memory space of WiMe device to the application interface memory space on target device server 160. Additionally or alternatively, application development system 150 may generate code, based on the configurations selected by the user, which may be used to program a microcontroller in target device 120, by storing the code in the application interface memory space and copying the code to WiMe device 110.

Although FIG. 1 show exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
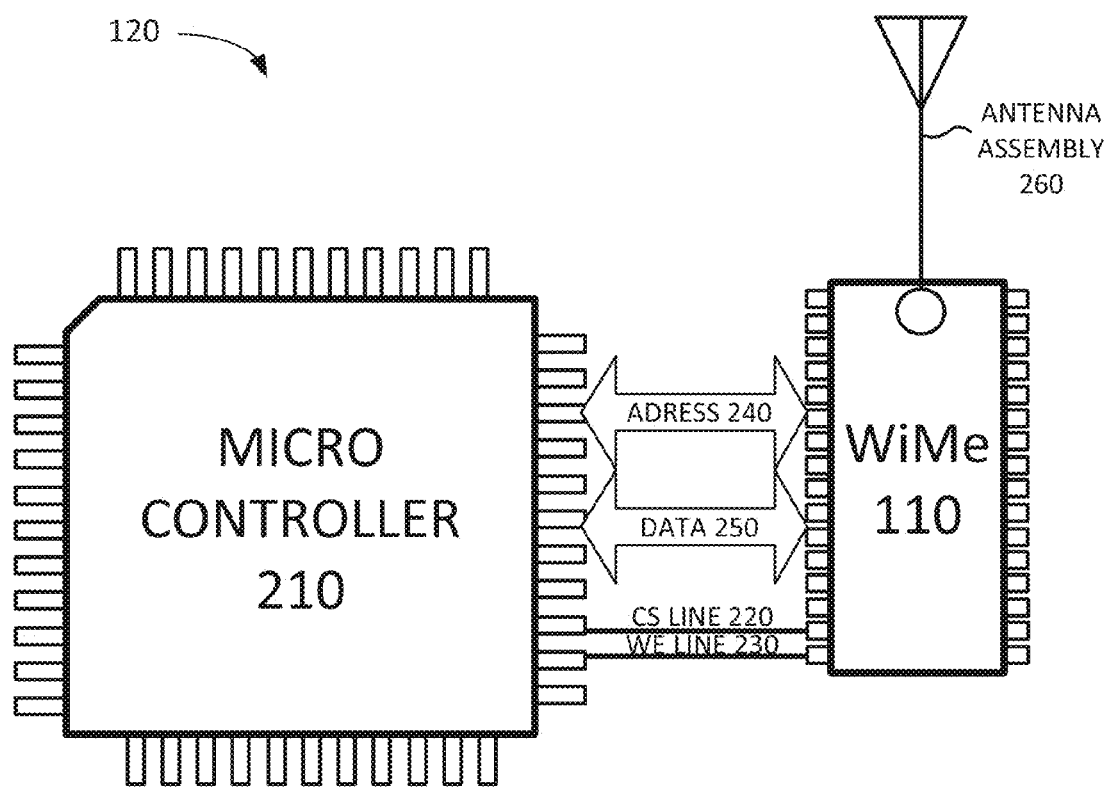
FIG. 2 is a diagram illustrating an exemplary implementation of the target device of FIG. 1.

FIG. 2 is a diagram illustrating an exemplary implementation of target device 120. As shown in FIG. 2, target device 120 may include a microcontroller 210 and WiMe device 110. Microcontroller 210 may control one or more functions of target device 120. Microcontroller 210 may use WiMe device 110 as a memory device. Microcontroller 210 and WiMe device 110 may be connected via a chip select (CS) line 220, a write enable (WE) line 230, an address bus 240, and a data bus 250.

Chip select line 220 may be used by microcontroller 210 to select WiMe device 110. Thus, when microcontroller 210 selects to read or write from/to the memory space of WiMe device 110, microcontroller 210 may select chip select line 220. Write enable line 230 may be used by microcontroller 210 to write to the memory space of WiMe device 110. Thus, when microcontroller 210 selects to read from the memory space of WiMe device 110, microcontroller 210 may activate chip select line 220 and may not activate write enable line 230. When microcontroller 210 selects to write to memory space of WiMe device 110, microcontroller 210 may activate chip select line 220 and may activate write enable line 230.

Address bus 240 may be used by microcontroller 210 to select a particular address in the memory space of WiMe device 110 from which data is to be read or to which data is to be written. Data bus 250 may be used by microcontroller 210 to write data to the particular address or to read data from the particular address.

WiMe device 110 may include antenna assembly 260. Antenna assembly 260 may include one or more antennas to transmit and/or receive RF signals over the air. Antenna assembly 260 may, for example, receive RF signals from WiMe device 110 and transmit the signals over the air to base station 135 and receive RF signals over the air from base station 135 and provide the RF signals to WiMe device 110.

Although FIG. 2 show exemplary components of target device 120, in other implementations, target device 120 may include fewer components, different components, differently arranged components, or additional components than depicted in FIG. 2. Additionally or alternatively, one or more components of target device 120 may perform functions described as being performed by one or more other components of target device 120.

Figure 3:
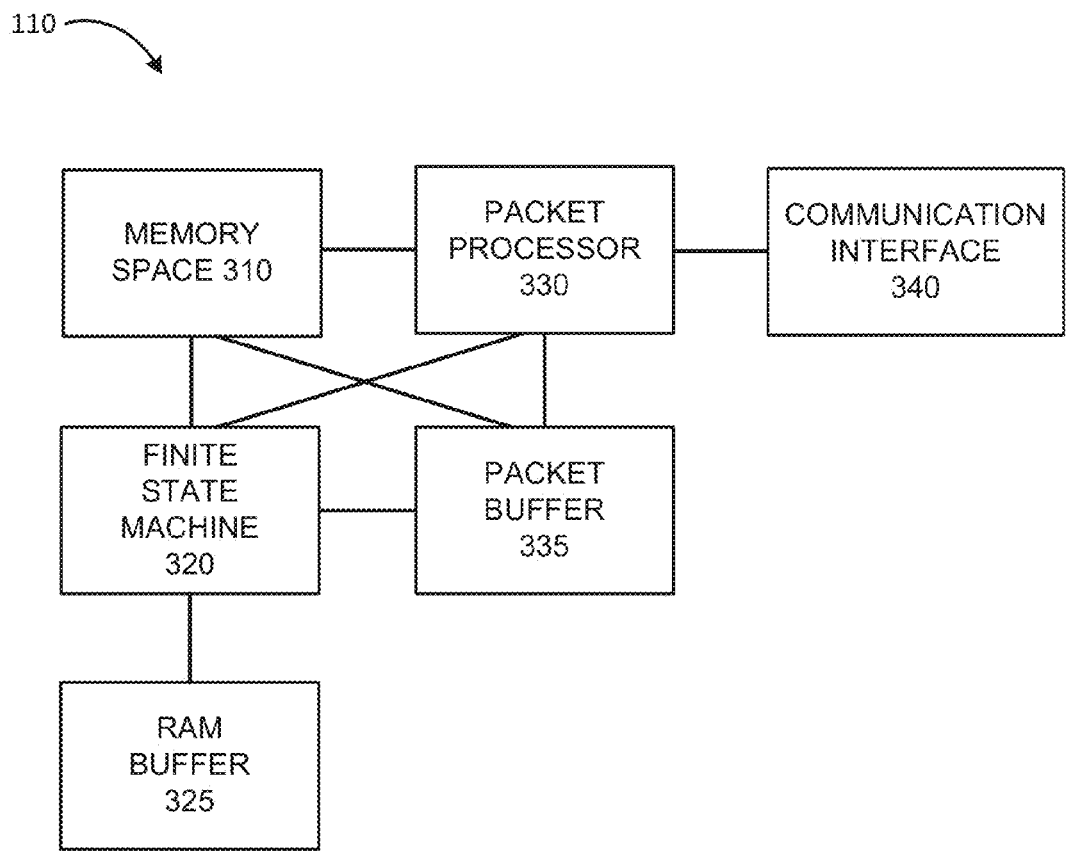
FIG. 3 is a diagram illustrating exemplary functional components of the wireless memory device of FIG. 1 according to an implementation described herein.

FIG. 3 is a diagram illustrating exemplary functional components of WiMe device 110 according to an implementation described herein. WiMe device 110 may include a memory space 310, a finite state machine 320, a Random Access Memory (RAM) buffer 325, a packet processor 330, a packet buffer 335, and a communication interface 340.

Memory space 310 may store data written to WiMe device 110 by microcontroller 210 or received from application interface memory space via antenna assembly 260. Finite state machine 320 may process requests to read and write data to memory space 310 and may process new data in RAM buffer 325 and/or packet buffer 335. Thus, if microcontroller 210 requests data from memory space 310, finite state machine 320 may copy the requested data to RAM buffer 325. If microcontroller 210 requests to write data to memory space 310, finite state machine 320 may write the data from RAM buffer 325 to a memory address specified by address bus 240 and may copy the data to packet buffer 335 to be processed by packet processor 330 and transmitted via communication interface 340. If data is received from application development system 150 or from target device server 160, the data may be processed by packet processor 330 and stored in packet buffer 335. Finite state machine 320 may store the data from packet buffer 335 at a memory address of memory space 310 corresponding to the memory address at which the data was stored in the application interface memory space in application development system 150 or from target device server 160.

RAM buffer 325 may store data that is to be read by microcontroller 210 from memory space 310 or that is to be written by microcontroller 210 to memory space 310. Thus, when microcontroller 210 reads data from a particular memory address via address bus 240, finite state machine 320 may place the data from the particular memory address to RAM buffer 325 and the data from RAM buffer 325 may be provided to microcontroller 210 via data bus 250. When microcontroller 210 activates write enable line 230, data from data bus 250 may be placed in RAM buffer 325 by finite state machine 320 and may be written to the memory address specified by address bus 240 (e.g., after chip select line 220 is deactivated).

Packet processor 330 may incorporate data, and an associated memory address, into one or more packets and may provide the one or more packets to communication interface 340 to transmit the one or more packets to the user application associated with target device 120. As mentioned above, the user application may reside on application development system 150 or on target device server 160. The one or more packets may correspond to, for example, Transmission Control Protocol (TCP) packets. Furthermore, packet processor 330 may receive one or more packets from communication interface 340, may retrieve data from the received one or more packets, may retrieve a memory address associated with the retrieved data from the received one or more packets, and may store the retrieved data and the retrieved memory address in packet buffer 335. Packet buffer 335 may store data, along with an associated memory address, that is to be sent wirelessly by communication interface 340 or that has been received by communication interface 340.

Communication interface 340 may include one or more logical components that may prepare data for wireless transmission by antenna assembly 260 or that may process data received by antenna assembly 260. For example, in some implementations, communication interface 340 may include a wireless chipset, such as a wireless chipset based on the Long Term Evolution (LTE) standard specified by the $3^{rd}$ Generation Partnership Project (3GPP). In other implementations, communication interface 340 may include a different type of wireless chipset, such as an enhanced High Rate Packet Data (eHRPD) wireless chipset, a WiFi wireless chipset, a Bluetooth™ wireless chipset, a near field communication chipset, and/or another type of chipset.

Although FIG. 3 show exemplary components of WiMe device 110, in other implementations, WiMe device 110 may include fewer functional components, different functional components, differently arranged functional components, or additional functional components than depicted in FIG. 3. Additionally or alternatively, one or more functional components of WiMe device 110 may perform functions described as being performed by one or more other functional components of WiMe device 110.

Figure 4:
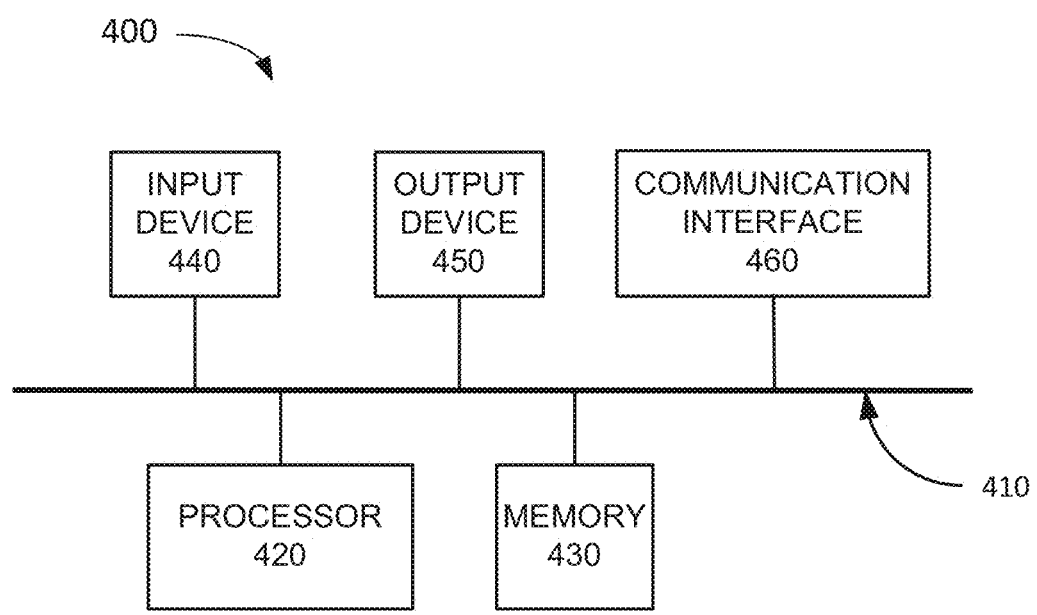
FIG. 4 is a diagram illustrating exemplary components of a device that may be included in a component of FIG. 1 according to an implementation described herein.

FIG. 4 is a diagram illustrating an exemplary device 400 that may be included in a component of the environment of FIG. 1 according to an implementation described herein. User device 140, application development system 150, and/or target device server 160 may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to communicating with a microcontroller through a wireless memory device. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally or alternatively, one or more components of device 400 may perform one or more tasks described as being performed by one or more other components of device 400.

Figure 5:
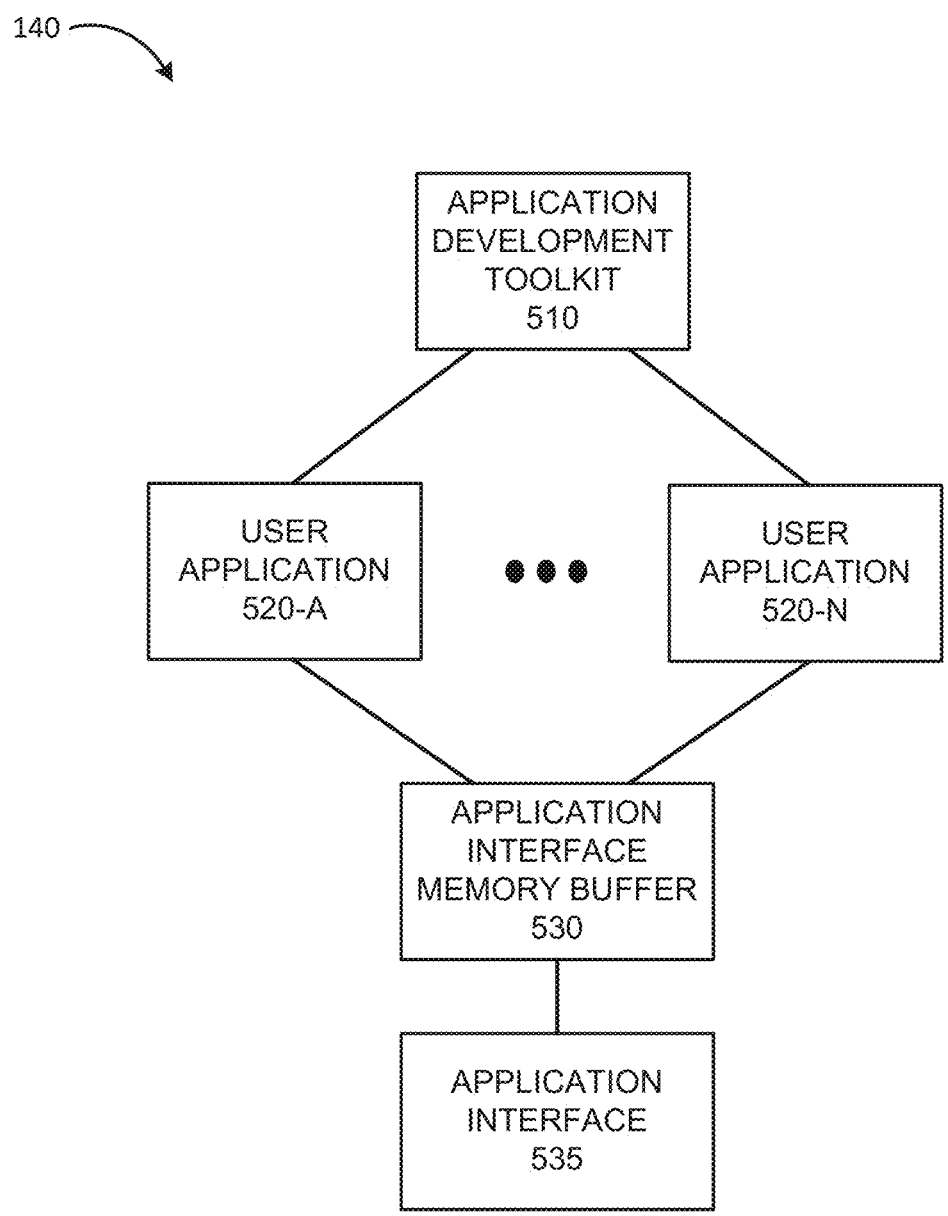
FIG. 5 is a diagram illustrating exemplary functional components of the target application system of FIG. 1 according to an implementation described herein.

FIG. 5 is a diagram illustrating exemplary functional components of application development system 150 according to an implementation described herein. The functional components of application development system 150 may be implemented, for example, via processor 420 executing instructions from memory 430. Alternatively, some or all of the functional components of application development system 150 may be implemented via hard-wired circuitry. As shown in FIG. 5, application development system 150 may include an application development toolkit 510, one or more user applications 520-A to 520-N (referred to herein collectively as "user applications 520" and individually as "user application 520"), an application interface memory buffer 530, and an application interface 535.

Application development toolkit 510 may provide functionality to develop a user application to interact with target device 120 and/or may provide functionality to program microcontroller 210. For example, application development toolkit 510 may provide a user interface to user device 140 to enable a user to configure target device 120 and may generate user application 520, and/or instructions for microcontroller 210, based on the configurations specified by the user.

Particular user applications 520 may interact with particular target devices 120. For example, each target device 120 may be associated with a user application 520 generated by application development toolkit 510 (or generated by a user and uploaded via user device 140). When user application 520 selects to send data to target device 120 via WiMe device 110, user application 520 may store data in application interface memory buffer 530 at a particular memory address. Information received from WiMe device 110 may be stored at a particular memory address in application interface memory buffer 530 by application interface 535 and may be retrieved by user application 520.

Application interface memory buffer 535 may store data that is to be sent to WiMe device 110 at memory addresses corresponding to memory address of WiMe device 110 at which the data is to be stored. Furthermore, application interface memory buffer 535 may store data received from WiMe device 110 at memory addresses at which the data was stored in WiMe device 110. Each user application 520 may be associated with a dedicated memory space in application interface memory buffer 535.

Application interface 535 may interface user application 520 with WiMe device 110. For example, user application 520 may store data at particular memory addresses of application interface memory buffer 535 and application interface 535 may incorporate the data, along with the corresponding memory addresses, into one or more packets, such as Transmission Control Protocol (TCP) packets and may send the one or more packets to WiMe device 110. Moreover, application interface 535 may receive one or more packets, such as TCP packets, from WiMe device 110, may extract data, along with corresponding memory addresses at which the data was stored in WiMe device 110, may store the data at the corresponding memory addresses in application interface memory buffer 535, and may inform a particular user application 520, associated with a particular WiMe device 110 from which the one or more packets were received, that new data has been stored in application interface memory buffer 535.

While user applications 520, application interface memory buffer 530, and application interface 535 has been described as being implemented in application development system 150, in other implementations, a particular user application 520, application interface memory buffer 530, and application interface 535 may be implemented in a particular target device server 160.

Although FIG. 5 shows exemplary functional components of application development system 150, in other implementations, application development system 150 may include fewer functional components, different functional components, differently arranged functional components, or additional functional components than depicted in FIG. 5. Additionally or alternatively, one or more functional components of application development system 150 may perform functions described as being performed by one or more other functional components of application development system 150.

Figure 6:
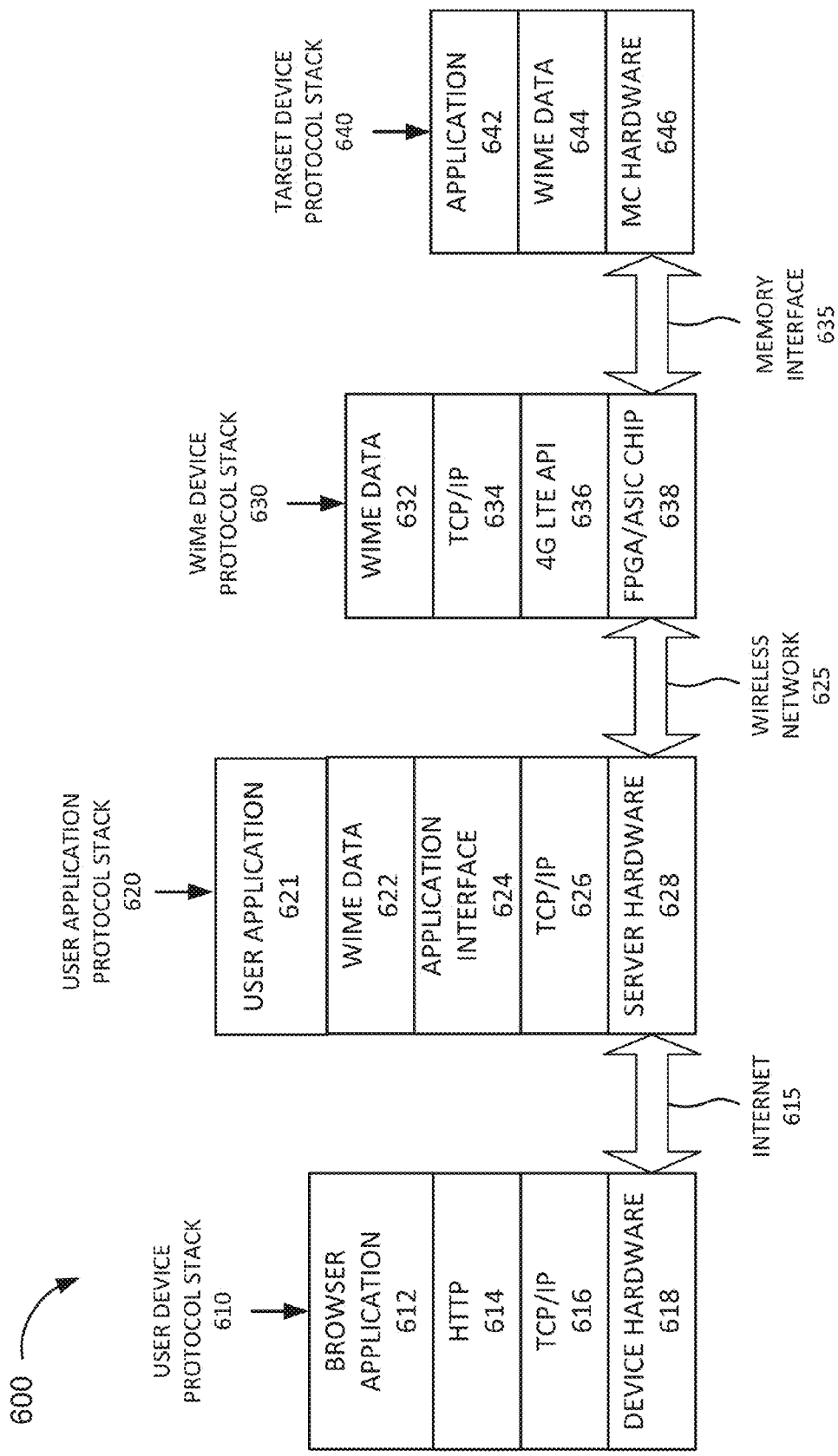
FIG. 6 is a diagram illustrating exemplary protocol stacks that may be exchanged by the components of FIG. 1 according to an implementation described herein.

FIG. 6 is a diagram illustrating exemplary protocol stacks 600 that may be exchanged by the components of environment 100 according to an implementation described herein. As shown in FIG. 6, protocol stacks 600 may include a user device protocol stack 610, a user application protocol stack 620, a WiMe device protocol stack 630, and a target device protocol stack 640.

User device protocol stack 610 may be associated with user device 140 and may include a browser application level 612, a Hypertext Transfer Protocol (HTTP) level 614, a TCP/IP level 616, and a device hardware level 618. A user may access a user application 520 in application development system 150, or target device server 160, using a browser application.

The browser application may communicate with user application 520 using a particular browser script, which may generate browser data. The browser data may be encapsulated in HTTP packets, which may be encapsulated in TCP/IP packets, which may be encapsulated further based on the hardware of user device 140 (e.g., Ethernet frames, etc.). The encapsulated packets may be sent to application development system 150, or target device server 160, over an Internet connection 615 (e.g., across network 130). User application 520 may receive the packets and may retrieve the browser application data to process data sent by the browser application (e.g., a request to obtain information from target device 120, a request to change a configuration of target device 120, etc.).

User application 520 may act on the request received from the browser application of user device 140 using user application protocol stack 620. User application protocol stack 620 may include a user application level 621, a WiMe data level 622, an application interface level 624, a TCP/IP level 626, and a server hardware level 628. At user application level 621, user application 520 may generate data to be provided to microcontroller 210. At the WiMe data level 622, the data may be converted to a format compatible with microcontroller 210 (e.g., microcontroller code and/or data format used by microcontroller 210) and may be associated with particular memory addresses used by microcontroller 210 for a particular purpose. At application interface level 624, application interface 535 may incorporate the WiMe data into TCP packets and may establish a connection with WiMe device 110 (e.g., by establishing an Internet Protocol Multimedia Subsystem (IMS) session with WiMe device 110). At TCP/IP level 626, an IP connection may be established with WiMe device 110 and at server hardware level 628, the data may be physically sent to WiMe device 110 over a wireless network connection 625, using base station 135.

WiMe device 110 may act on data received from user application 520, or data to be sent to user application 520, using WiMe device protocol stack 630. WiMe device protocol stack 630 may include a WiMe data level 632, a TCP/IP level 634, a 4G LTE application interface level 636, and an FPGA/ASIC chip level 638. At WiMe data level 632, WiMe data being used by microcontroller 210 may be stored at particular memory addresses in memory space 310. At TCP/IP level 634, TCP packets may be generated by packet processor 330 based on data to be sent to user application 520 or data may be retrieved from TCP packets, received via a wireless chip set of communication interface 340, by packet processor 330. At 4G LTE application interface level 636, the wireless chipset of communication interface 340 may send or receive the TCP packets over the air interface with base station 135 using Evolved Universal Terrestrial Radio Access (E-UTRA) protocols. At FPGA/ASIC chip level 638, the E-UTRA protocols may be implemented by the instructions with which the hardware of WiMe device 110 has been configured.

Microcontroller 210 may interact with data stored on WiMe device 110 using target device protocol stack 640. Target device protocol stack 640 may include an application level 642, a WiMe data level 644, and a microcontroller (MC) hardware level 646. At application level 642, microcontroller 210 may process the data stored in WiMe device 110 based on the instructions for which microcontroller 210 has been programmed. In some implementations, the instructions may be also be stored in WiMe device 110. At WiMe data level 644, microcontroller 210 may retrieve data from WiMe 110 or store data in WiMe 110. For example, at WiMe data level 644, an application call to read data may be converted into one or more instructions to access WiMe device 110. At MC hardware level 646, microcontroller 640 may activate chip enable line 220, write enable line 230, address bus 240, and/or data bus 250 to interact with WiMe chip 110.

Although FIG. 6 shows exemplary components of protocol stacks 600, in other implementations, protocol stacks 600 may include fewer components, different components, differently arranged components, or additional components than depicted in FIG. 6.

Figure 7:
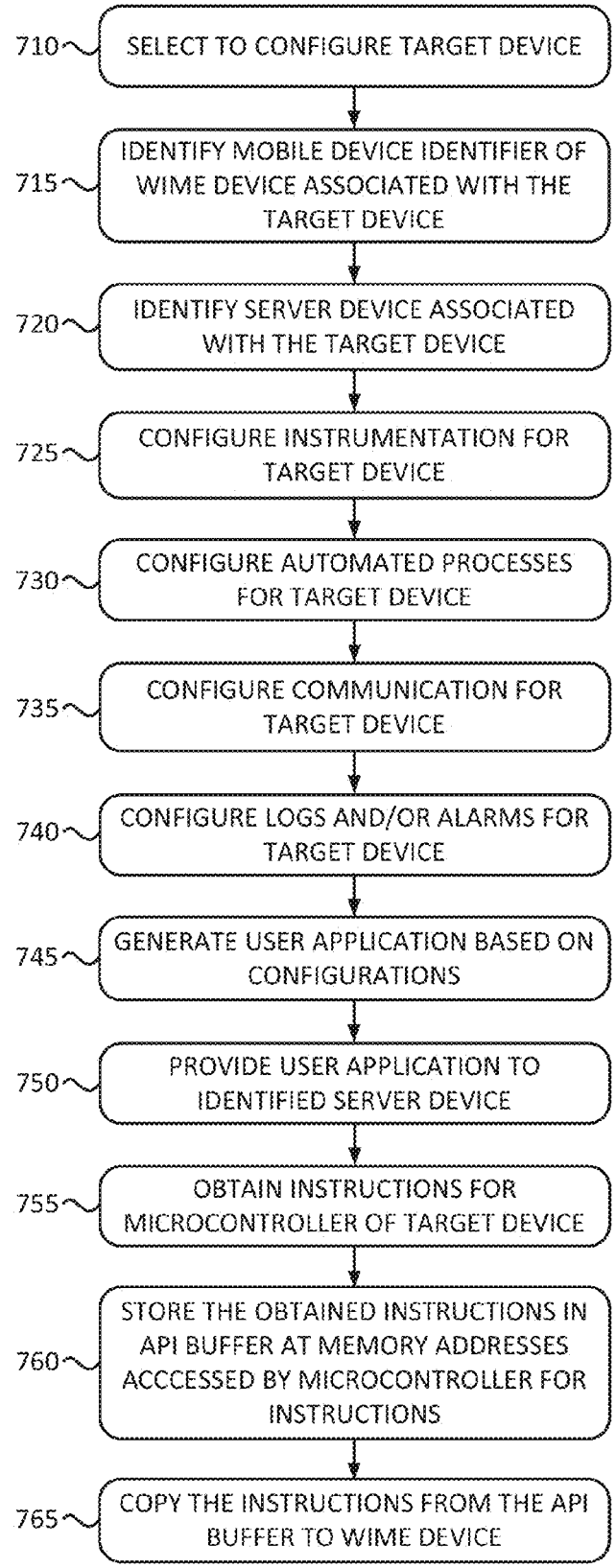
FIG. 7 is a flowchart of an exemplary process for configuring a user application for a target device according to an implementation described herein.

FIG. 7 is a flowchart of an exemplary process for configuring a user application for a target device according to an implementation described herein. In one implementation, the process of FIG. 7 may be performed by application development system 150. In other implementations, some or all of the process of FIG. 7 may be performed by another device or a group of devices separate from application development system 150 and/or including application development system 150.

The process of FIG. 7 may include selecting to configure a target device (block 710). For example, a user may use user device 140 to activate application development toolkit 510 in application development system 150 and application development toolkit 510 may provide a user interface to user device 140 that may enable the user to select configurations associated with a target device 120.

A mobile device identifier of a WiMe device associated with the target device may be identified (block 715). For example, the user may specify a mobile device identifier associated with WiMe device 110 associated with target device 120. The mobile device identifier may include a Mobile Subscriber Integrated Services Digital Network number (MSISDN), an International Mobile Subscriber Identity (IMSI) number, a mobile identification number (MIN), an International Mobile Equipment Identifier (IMEI), an Integrated Circuit Card Identifier (ICCI), and/or any other mobile communication device identifier. In some implementations, the mobile device identifier may be hardwired into WiMe device 110. In other implementations, WiMe device 110 may be configured with a particular mobile device identifier. For example, the wireless chip set may include a virtual Subscriber Identity Module (SIM) card that may be configured with a particular mobile device identifier. The mobile device identifier may be, for example, assigned by a wireless network provider associated with base station 135.

A server device associated with the target device may be identified (block 720). For example, the user may specify a particular target device server 160 that may host a user application for target device 120. Alternatively, the user application may be hosted by application development system 150.

Instrumentation for the target device may be configured (block 725). For example, the user may create an instrument panel (e.g., window pane in a user interface) that may include one or more instruments associated with target device 120. The user may control the instruments by using the instrument panel, which may be provided by the user application that will be generated as a result of the user's selected configurations. The instrument panel may be used, for example, to control and/or obtain information from a sensor associated with target device 120 (e.g., a temperature sensor, a Global Positioning System (GPS) receiver, a camera, etc.), to control and/or monitor an actuator associated with target device 120 (e.g., a motor, a switch, a light source, etc.), to send or receive information from a data store associated with target device 120 (e.g., a memory device, etc.), and/or to control another type of function associated with target device 120. A particular interface may be defined for microcontroller 210 and an instrument may be associated with the particular interface.

Automated processes for the target device may be configured (block 730). For example, the user may create an automated processes panel that may include one or more automated processes associated with target device 120. The automated processes may be performed by microcontroller 210 continuously or when a trigger event specified by the user is satisfied. An automated process may, for example, perform a repeated action continuously, at particular intervals, or in response to a particular trigger event.

Communication for the target device may be configured (block 735). For example, the user may create a communications panel that may include one or more devices and/or addresses to which target device 120 is to send messages or from which target device 120 is to receive messages, such as an email address, phone number, IP address of a data logger, and/or another type of address. Logs and/or alarms for the target device may be configured (block 740). For example, the user may create a logs and alarms panel that may include a data log specifications and/or may define an alarm that is to be triggered if a particular trigger event occurs. As an example, the user may specify that if a sensor is activated, sensor data should be sent to an address specified in the communications panel.

A user application may be generated based on the configurations (block 745). For example, application development toolkit 510 may compile code for user application 520 to interact with target device 120 through WiMe device 110 and to generate a user interface to enable the user interact with target device 120 via user application 520. User application 520 may, for example, convert a user request into input, which may be stored in application interface memory buffer 530. The input may be copied to memory space 310 of WiMe device 110 and may be acted upon by microcontroller 210 based the instructions for which microcontroller 210 is programmed. The user application may be provided to the identified server device (block 750). For example, if the user has specified a particular target device server 160, application development system 150 may provide the generated user application 520 to the particular target device server 160.

Instructions for a microcontroller of the target device may be obtained (block 755). For example, application development toolkit 510 may generate microcontroller code, or may modify existing microcontroller code, associated with microcontroller 210, based on the configurations selected by the user. Alternatively or additionally, a user may provide some or all of the code for microcontroller 210 to application development system 150 via user device 140. The obtained instructions for the microcontroller may be stored in an application interface memory buffer at memory addresses that are accessed by the microcontroller to execute instructions (block 760) and the instructions may be copied from the application interface memory buffer to the WiMe device (block 765). For example, application development tool kit 510 may determine memory addresses associated with microcontroller instructions in WiMe device 110 and may store the generated code in application interface memory buffer 530. Application interface 535 may copy the instructions to WiMe device 110 by incorporating the code, along with the associated memory addresses, into TCP packets and sending the TCP packets to WiMe device 110.

Figure 8:
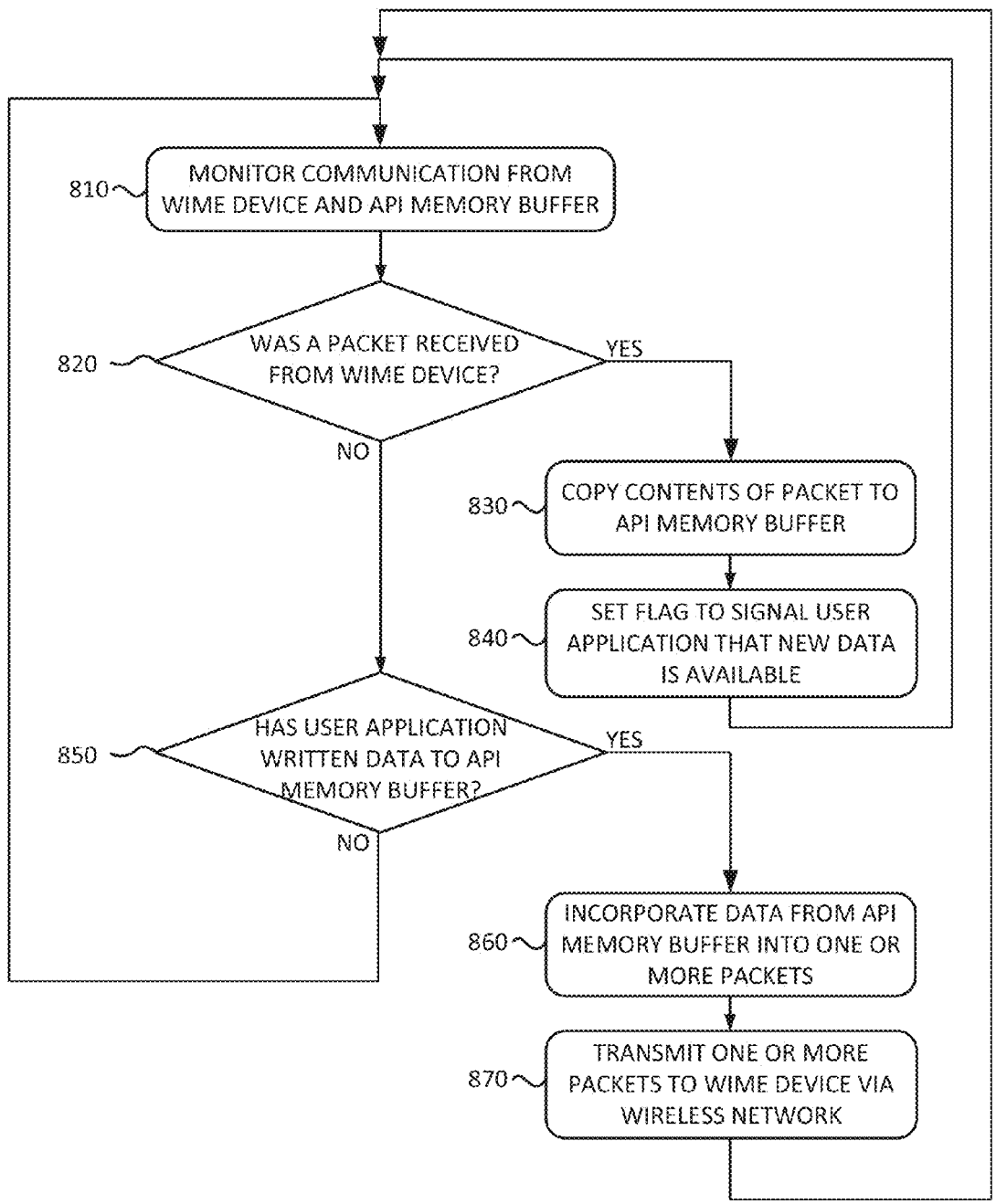
FIG. 8 is a flowchart of an exemplary process for processing data associated with a wireless memory device according to an implementation described herein.

FIG. 8 is a flowchart of an exemplary process for processing data associated with a wireless memory device according to an implementation described herein. In one implementation, the process of FIG. 8 may be performed by application development system 150 and/or target device server 160. In other implementations, some or all of the process of FIG. 8 may be performed by another device or a group of devices separate from application development system 150 and/or target device server 160, and/or including application development system 150 and/or target device server 160.

The process of FIG. 8 may include monitoring communication from a WiMe device and monitoring an application interface memory buffer (block 810). For example, application interface 535 may monitor application interface memory buffer 530 to determine whether new data has been added. For example, when user application 520, or application development toolkit 510, writes new data to application interface memory buffer 530, a write flag may be set and detected by application interface 535. Furthermore, application interface 535 may monitor a packet buffer that receives packets from WiMe device 110 to determine whether a new packet has been received.

A determination may be made as to whether a packet was received from a WiMe device (block 820). As an example, application interface 535 may determine that a packet buffer includes a new data. As another example, application interface 535 may receive an indication from a communication interface that a packet has been received from WiMe device 110. If a packet was received from the WiMe device (block 820—YES), the contents of the packet may be copied to an application interface memory buffer (block 830) and a flag may be set to signal a user application that new data is available (block 840). For example, application interface 535 may identify user application 520 associated with the received packet (e.g., based on a source IP address of the packet, based on a mobile device identifier included in the packet, etc.). Application interface 535 may retrieve data from the packet, may retrieve a memory address associated with the data, and may store the retrieved data at the retrieved memory address in a region of application interface memory buffer 530 associated with the identified user application 520. Application interface 535 may then set a flag associated with user application 520 to inform user application 520 that new data has been stored in application interface memory buffer 530. Processing may return to block 810 to monitor communication from the WiMe device and to monitor the application interface memory buffer.

If a packet has not been received from the WiMe device (block 820—NO), a determination may be made as to whether a user application has written data to the application interface memory buffer (block 850). For example, user application 520 may write new data to application interface memory buffer 530 and may set a write flag that may be detected by application interface 535. If a user application has written data to the application interface memory buffer (block 850—YES), the data from the application interface memory buffer may be incorporated into one or more packets (block 860) and the one or more packets may be transmitted to the WiMe device via a wireless network (block 870). For example, application interface 535 may incorporate the new data, along with the corresponding memory addresses at which the data has been stored in application interface memory buffer 530, into one or more TCP packets. The one or more TCP packets may be sent to the WiMe device 110 associated with the particular user application 520 that has written the data. For example, application interface 535 may determine the mobile device identifier and may request to establish a connection with WiMe device 110 by, for example, requesting an IMS Session Initiation Protocol (SIP) session. Once an IMS SIP session is established, an LTE bearer may be established between a packet gateway and WiMe device 110 and the one or more packets may be sent to WiMe device 110 over the established connection and bearer.

Processing may then return to block 810 to monitor communication from the WiMe device and to monitor the application interface memory buffer. If a user application has not written data to the application interface memory buffer (block 850—NO), processing may also return to block 810 to monitor communication from the WiMe device and to monitor the application interface memory buffer.

Figure 9:
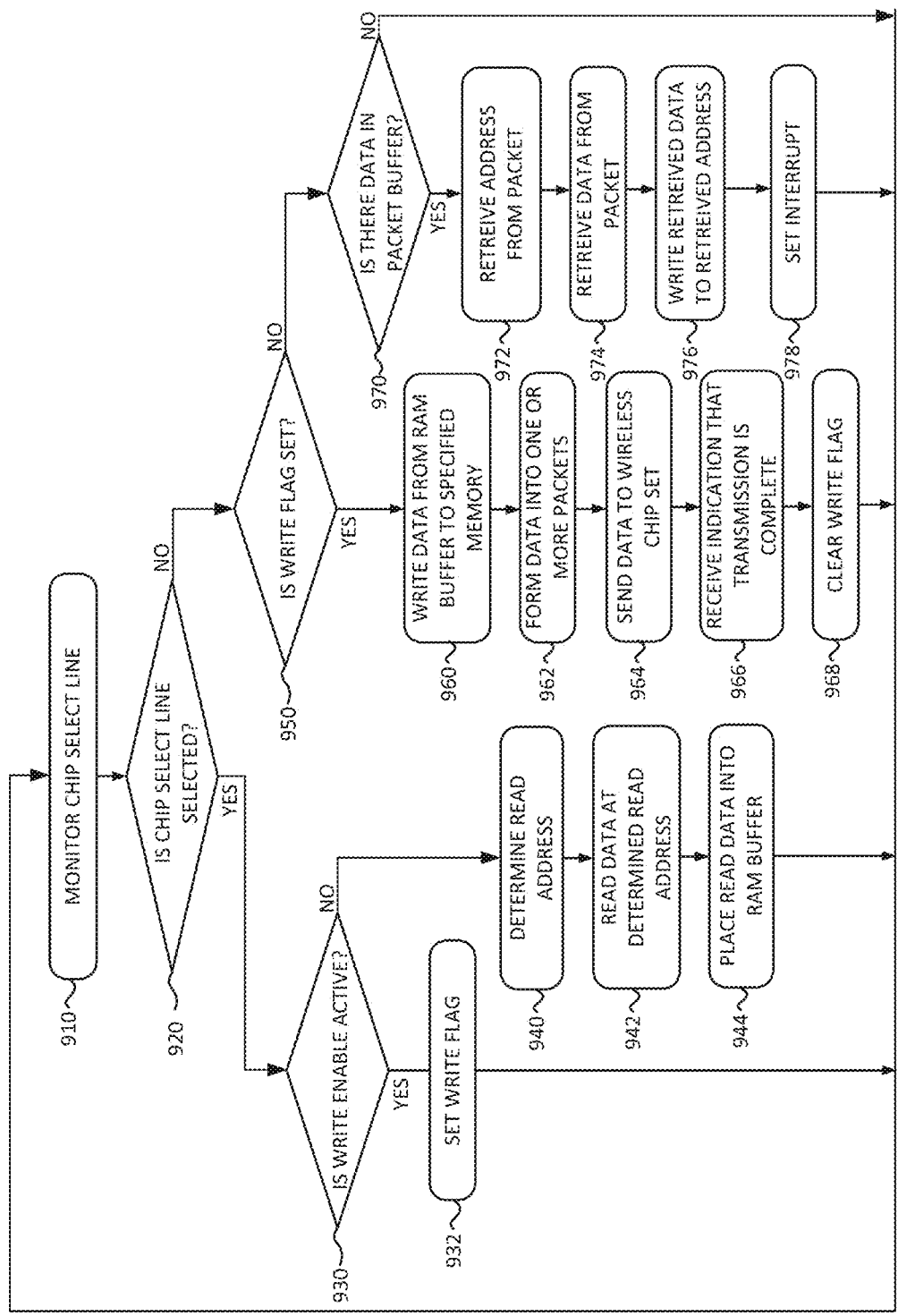
FIG. 9 is a flowchart of an exemplary process performed by a finite state machine of a wireless memory device according to an implementation described herein.

FIG. 9 is a flowchart of an exemplary process performed by a finite state machine of a wireless memory device according to an implementation described herein. In one implementation, the process of FIG. 9 may be performed by WiMe device 110. In other implementations, some or all of the process of FIG. 9 may be performed by another device or a group of devices separate from WiMe device 110 and/or including WiMe device 110.

The process of FIG. 9 may include monitoring a chip select line (block 910) and determination may be made as to whether the chip select line is selected (block 920). For example, finite state machine 320 may monitor chip select line 220 to determine whether chip select line 220 is active. If the chip select line is selected (block 920—YES), a determination may be made as to whether the write enable line is active (block 930). For example, if the chip select line 220 is active, microcontroller 210 is accessing WiMe device 110 and WiMe device 110 may need to respond to the read or write requests of microcontroller 210. Furthermore, since new data may be in the process of being written to memory space 310, finite state machine 320 may need to wait until the writing process has completed before performing any transmission of data or before processing any new received data.

If write enable is active (block 930—YES), a write flag may be set. For example, if write enable line 230 is active, microcontroller 210 is writing new data to WiMe device 110. The new data may be stored in RAM buffer 325, along with the destination memory address, and a write flag may be set. Processing may return to block 910 to monitor to chip select line 220.

If write enable is not active (block 930—NO), microcontroller 210 may be reading data from WiMe device 110. Thus, a read address may be determined (block 940), data at the read address may be read (block 942), and the read data may be placed into the RAM buffer (block 944). For example, finite state machine 320 may determine the address from address bus 240 and may place the data from the determined address into RAM buffer 325. The data in RAM buffer 325 may be output via data bus 250. Processing may return to block 910 to monitor chip select line 220.

Returning to block 920, if the chip select line is not selected (block 920—NO), a determination may be made as to whether the write flag is set (block 950). If the write flag is set (block 950—YES), the data from the RAM buffer may be written to the specified memory. For example, finite state machine 320 may write the data from RAM buffer 325 to the memory address determined from address bus 240. Furthermore, the data may be mirrored to application interface memory buffer 530 by forming the data into one or more packets (block 962) and sending the data to the wireless chip set (block 964). For example, finite state machine 320 may copy the data from RAM buffer 325 to packet buffer 335, along with the memory addresses at which the data was written. Packet processor 330 may incorporate the data, along with the corresponding memory addresses, into one or more TCP packets and may provide the one or more TCP packets to communication interface 340. The wireless chip set of communication interface 340 may request a dedicated bearer to the packet gateway associated with WiMe device 110 and may then request an IMS SIP session with application development system 150 (or with target server device 160, if user application 520 resides on target server device 160). The wireless chipset may receive an indication from the wireless network that the transmission is complete (block 966) and the write flag may be cleared (block 968). For example, the wireless chipset may inform packet processor 330 that the transmission has been completed and packet processor 330 may inform finite state machine 320 that the write flag may be cleared to indicate that the writing process, along with the process of mirroring the data to the server, has been completed. Processing may return to block 910 to monitor chip select line 220.

Returning to block 950, if the write flag is not set (block 950), a determination may be made as to whether there is data in the packet buffer (block 970). For example, when communication interface 340 received a packet, the packet may be forward to packet processor 330 and stored in packet buffer 335. If there is data in the packet buffer (block 970—YES), an address may be retrieved from the packet (block 972), data may be retrieved from the packet (block 974), and the retrieved data may be written to the retrieved memory address (block 976). For example, packet processor 330 may process the packet to retrieve a memory address and data from the packet and finite state machine 320 may write the retrieved data to the retrieved memory address.

In some implementations, an interrupt may be set (block 978). The interrupt may inform microcontroller 210 that new data has been written to memory. In other implementations, an interrupt may be not be set and microcontroller 210 may access the new data as determined by the instructions for which microcontroller 210 has been programmed. Returning to block 970, if there is no data in the packet buffer (block 970—NO), processing may return to block 910 to monitor chip select line 220.

Figure 10A:
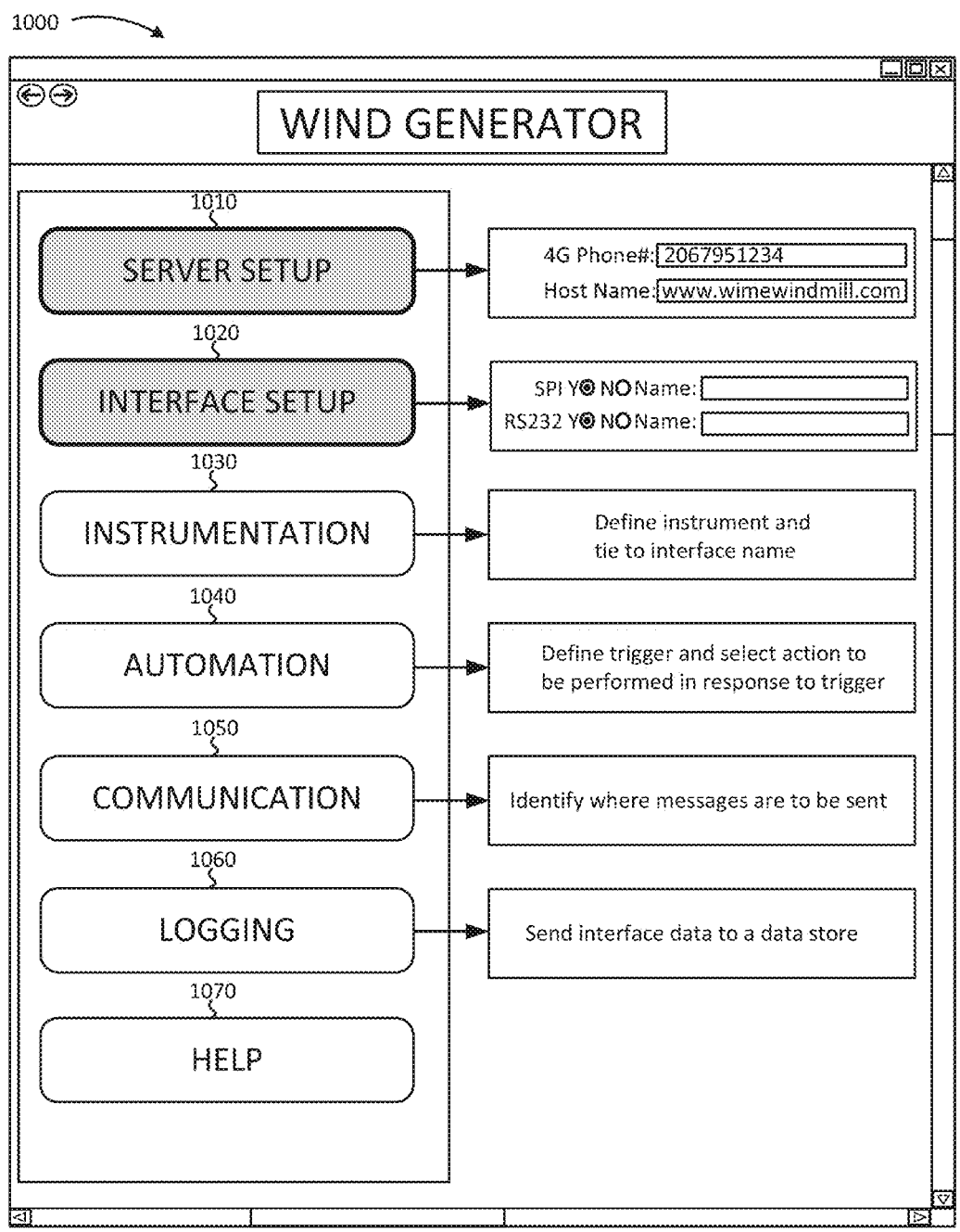
FIGS. 10A and 10B are diagrams of exemplary user interfaces according to an implementation described herein.
Figure 10B:
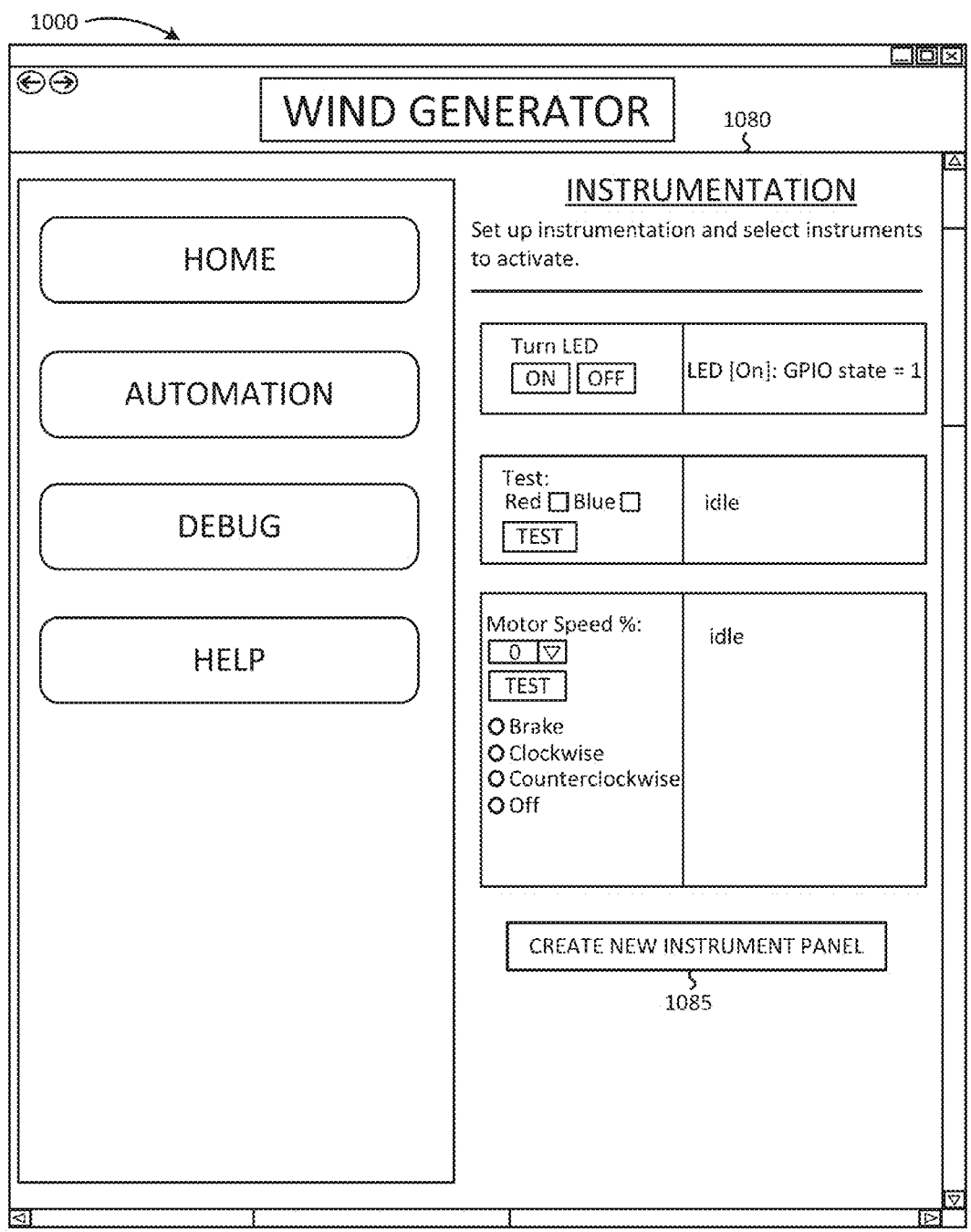

FIGS. 10A and 10B are diagrams of exemplary user interfaces according to an implementation described herein. FIG. 10A illustrates a user interface 1000 that may be generated by a browser application running on user device 140 when user device 140 activates application development toolkit 510. As shown in FIG. 10A, user interface 1000 may include a server setup selection object 1010, an interface setup selection object 1020, an instrumentation selection object 1030, an automation selection object 1040, a communication selection object 1050, a logging selection object 1060, and a help selection object 1070.

Server setup selection object 1010 may enable the user to select a mobile device identifier and/or a server associated with target device 110. Interface setup selection object 1020 may enable the user to define interfaces for microcontroller 210, such as a Serial Peripheral Interface (SPI) bus or an RS-232 interface. Instrumentation selection object 1030 may enable the user to define instruments and tie the instruments to a particular interface of microcontroller 210. Automation selection object 1040 may enable the user to define one or more automated processes, and/or triggers for the processes, for target device 110. Communication selection object 1050 may enable the user to define a device or an address to which messages may be sent from target device 110, or from which messages may be received by target device 110. Logging selection object 1060 may enable the user to define a data store to which data (e.g., interface data associated with an instrument) should be sent. Furthermore, logging selection object 1060 may enable the user to define an alarm by defining a trigger event and an action to be performed in response to the trigger event. Help selection object 1070 may enable the user to search for help in a particular topic associated with the configuration of target device 110.

FIG. 10B illustrates user interface 1000 after the interface setup selection object 1020 has been activated. User interface 1000 may now include an instrumentation panel 1080. Instrumentation panel 1080 may include a selection object 1085 to add a new instrument panel and may include any instrument panels that the user has added. In the example of FIG. 10B, the user has added, for a wind generator target device, an instrument panel to turn a light emitting diode (LED) on or off, an instrument panel to test red and blue light indicators, and an instrument panel to manipulate a motor.

Figure 11A:
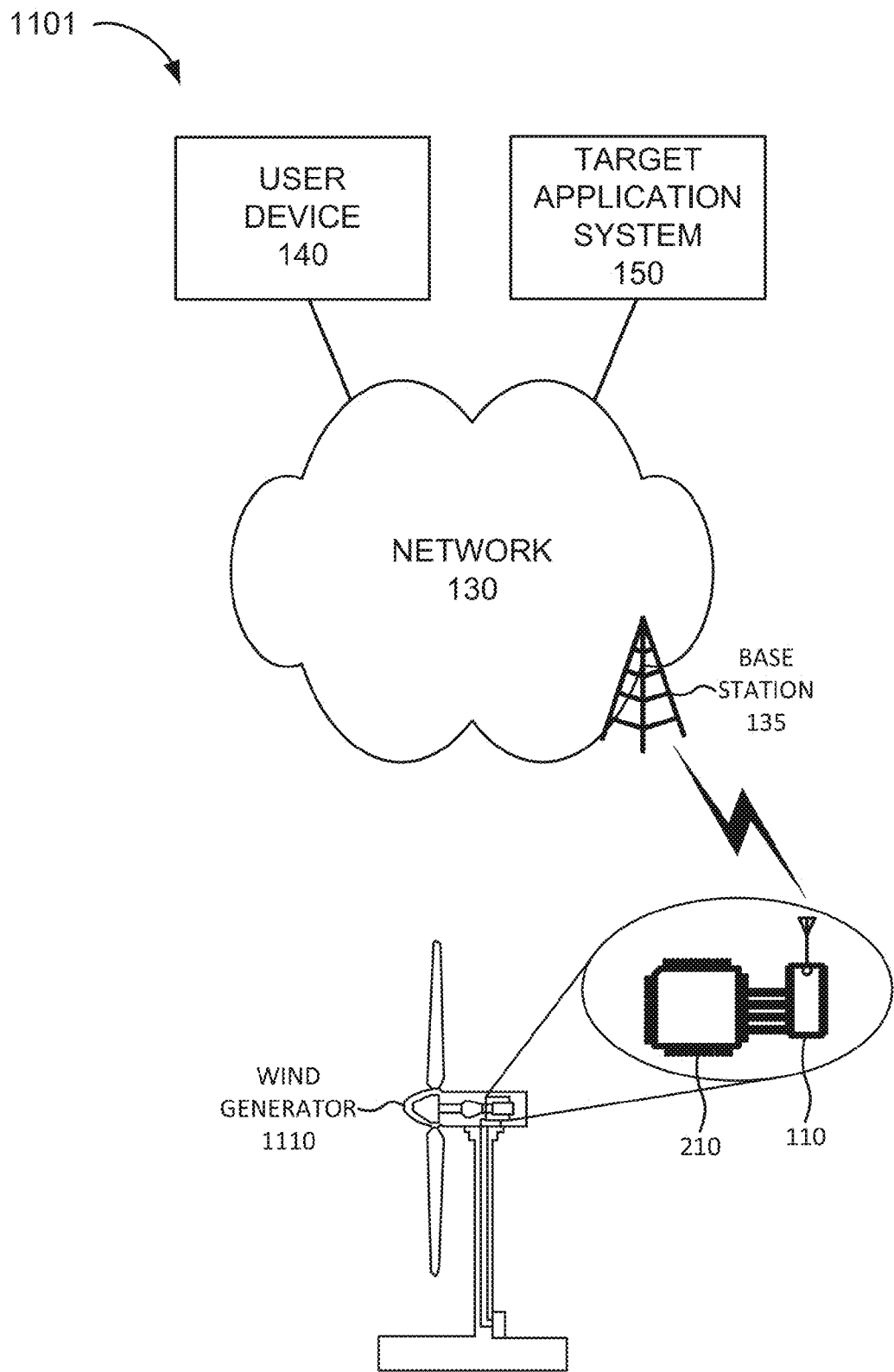

FIG. 11A is a diagram of a first exemplary system 1101 according to an implementation described herein. As shown in FIG. 11A, system 1101 may include network 130, user device 140, application development system 150, and wind generator 1110. Wind generator 1110 may correspond to target device 120. Wind generator 1110 may include WiMe device 110 and microcontroller 210. WiMe device 110 may communicate with application development system 150 via base station 135. In the example of FIG. 11A, user application 520, associated with wind generator 1110, may reside on application development system 150.

FIG. 11B illustrates exemplary code 1102 that may be used in system 1101. As shown in FIG. 11B, exemplary code 1102 may include a microcontroller code portion 1120 and an application code portion 1130. Microcontroller code portion 1120 may be executed by microcontroller 210 in wind generator 1110 and may record the speed of a generator motor (in revolutions per minute (RPM)) and may record the power being generated in watts. Application code portion 1130 may be executed by application development system 150 as part of user application 520 and may display the speed of the generator motor and the power being generated.

Figure 11C:
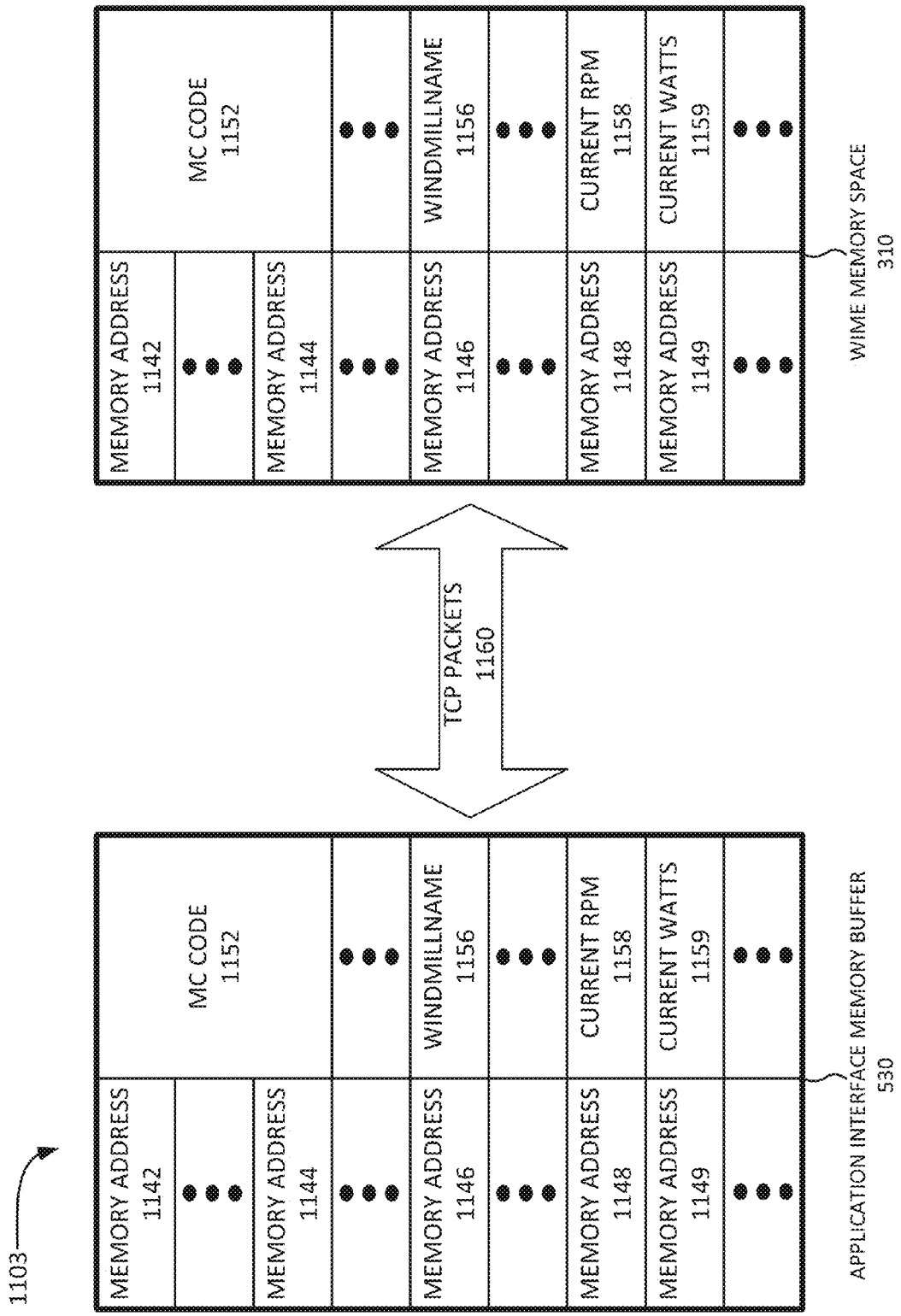

FIG. 11C illustrates memory space 1103 relating to exemplary code 1102. As shown in FIG. 11C, memory space 1103 may include application interface memory buffer 530 and WiMe memory space 310. WiMe memory space 310 may include microcontroller code 1152, stored at memory addresses 1142 to 1144, which may include microcontroller code portion 1120. WiMe memory space 310 may further include a wind mill name 1156 stored at memory address 1146, current RPM 1158 stored at memory address 1148, and current watts 1159 stored at memory address 1149, which may be mirrored in application interface memory buffer 530 through TCP packets 1160.

Figure 11D:
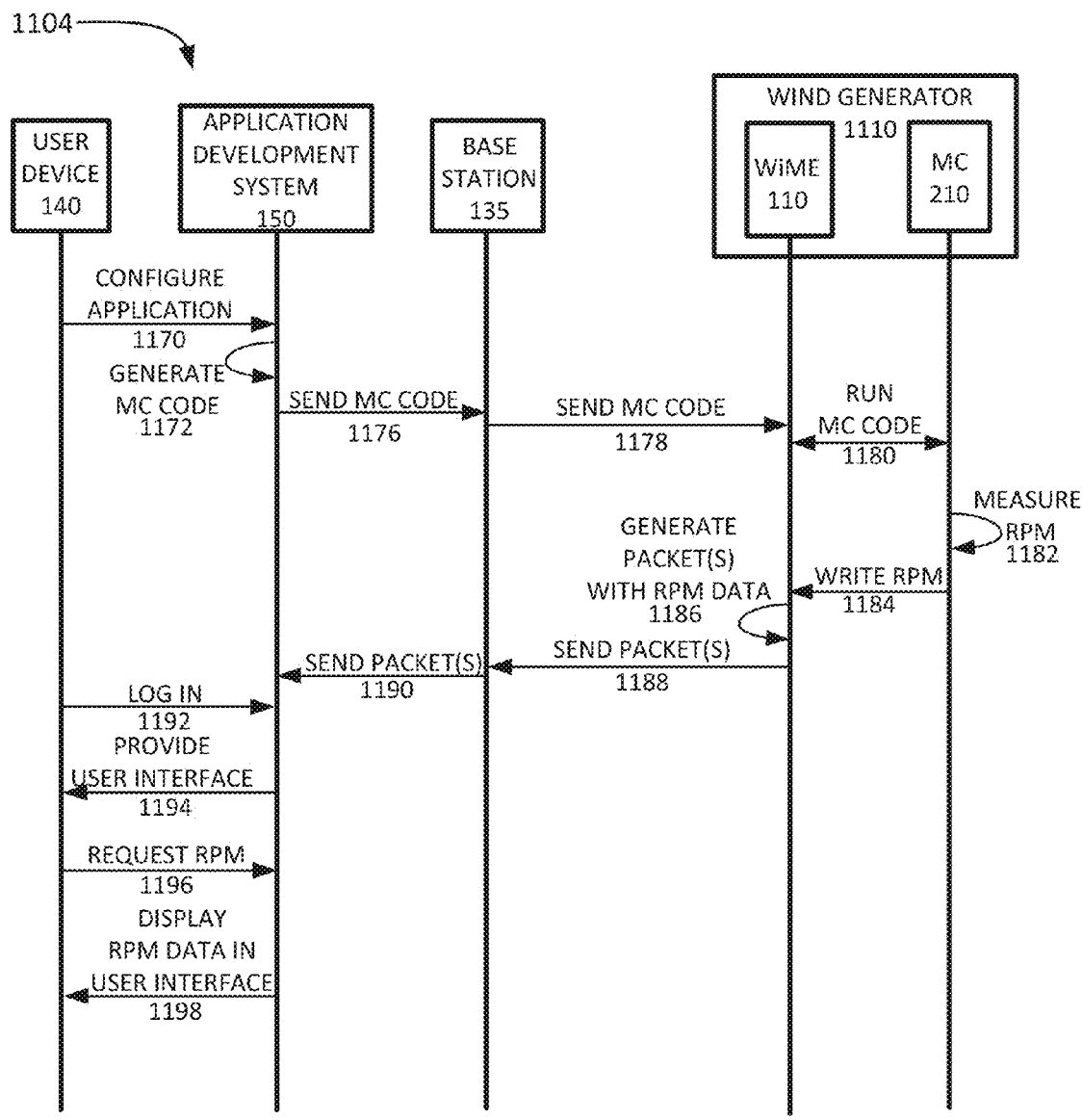

FIG. 11D illustrates a signal flow 1104 relating to exemplary code 1102 and memory space 1103. Signal flow 1104 may include a request by user device 140 to configure a user application associated with wind generator 1110 (signal 1170). Application development system 150 may generate microcontroller code (signal 1172) based on configuration selected by the user (or based on code uploaded by the user). The microcontroller code may be sent by application development system 150 to base station 135 (signal 1176) and by base station 135 to WiMe device 110 in wind generator 1110 (signal 1178). The microcontroller code may be stored in WiMe device 110 and may be executed by microcontroller 210 (signal 1180). As part of the code being executed by microcontroller 210, the current RPM of the wind generator, along with the current watts being generated, may be measured (signal 1182) and stored in WiMe device 110 (signal 1184).

Finite state machine 320 of WiMe device 110 may detect that new data has been written to memory space 310 of WiMe device 110 and may generate TCP packets that include the new data, along with the memory addresses at which the data has been written. The generated TCP packets may be sent to application development system 150 via base station 135 (signals 1188 and 1190). Application interface 310 may detect that packets have been received from WiMe device 110 and may retrieve the data and the associated addresses and store the data at the retrieved addresses in application interface memory buffer 530.

The user may log in using a browser application on user device 140 (signal 1192) and user application 520 may provide a user interface to the browser application (signal 1194). The user may select to view the current RPM of wind generator 1110 (signal 1196). In response, user application 520 may access application interface memory buffer 530 to retrieve the current RPM and may display the RPM data in the user interface (signal 1198).

Figure 12A:
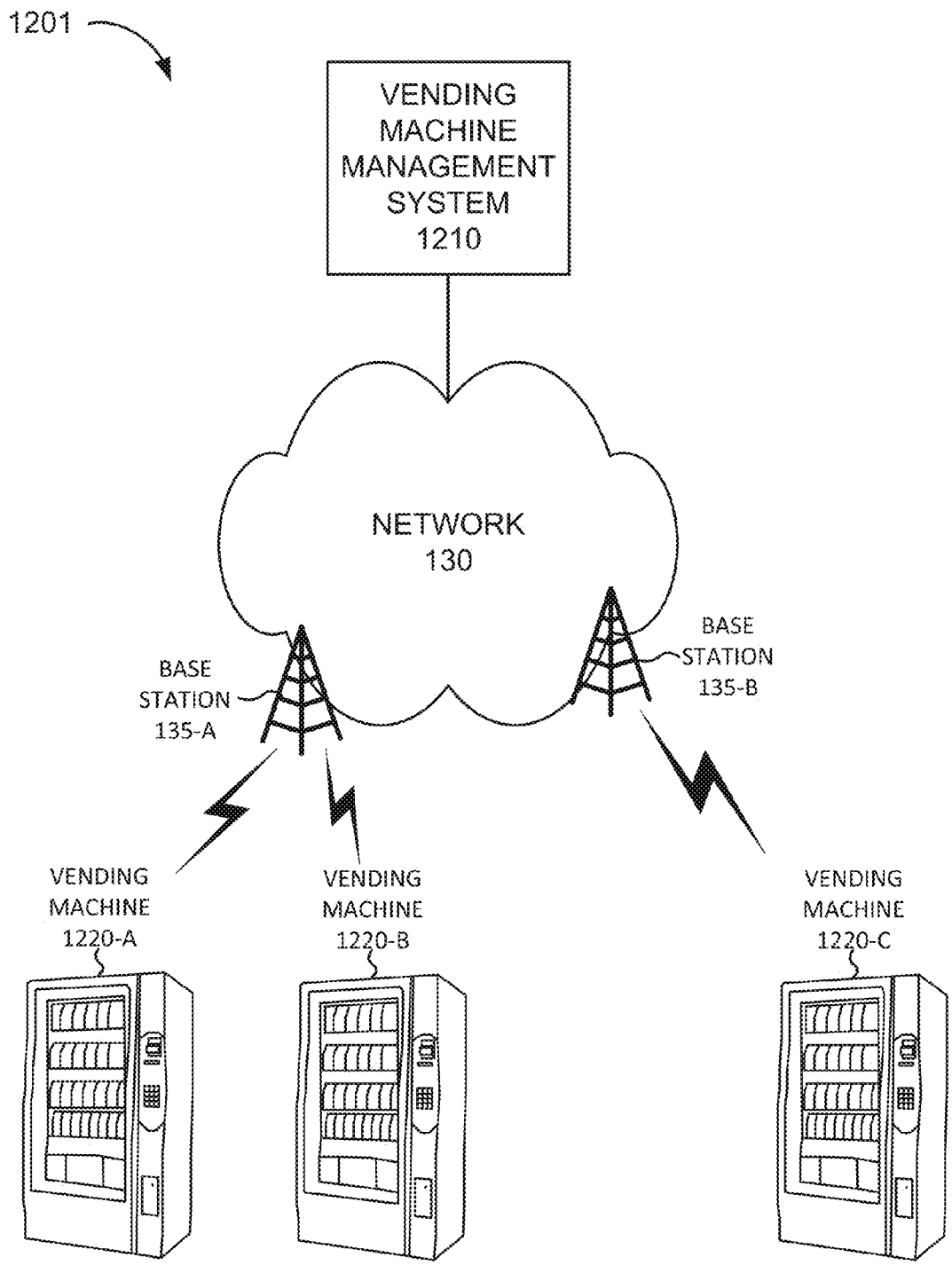
FIGS. 12A and 12B are a diagram of a second exemplary system according to an implementation described herein.

FIG. 12A is a diagram of a second exemplary system 1201 according to an implementation described herein. As shown in FIG. 12A, system 1201 may include network 130, a vending machine management system 1210, and vending machines 1220-A, 1220-B, and 1220-C (referred to herein collectively as "vending machines 1220" and individually as "vending machine 1220"). Vending machines 1220-A, 1220-B, and 1220-C may correspond to target devices 120. Vending machines 1220-A and 1220-B may communicate with network 130 via base station 135-A and vending machine 1220-C may communicate with network 130 via base station 135-B. Vending machine management system 1210 may correspond to target device server 160 and may include user application 520 to interact with vending machines 1220-A, 1220-B, and 1220-C. Vending machines 1220 may each include microcontroller 210 and WiMe device 110 and may process purchases of products included in vending machines 1220.

Figure 12B:
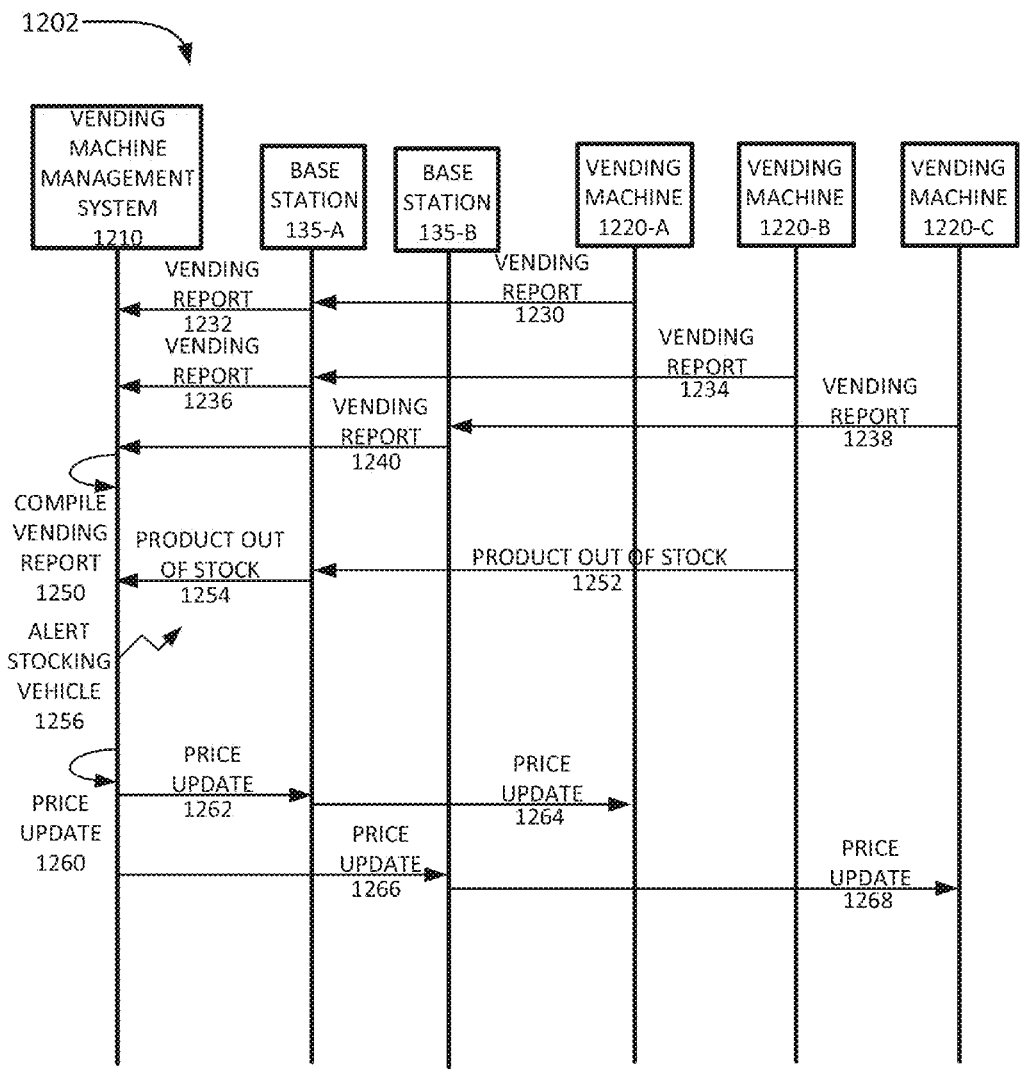

FIG. 12B illustrates a signal flow 1202 relating to system 1201. Microcontrollers 210 of vending machines 1200 may be programmed to generate a vending report at particular intervals and store the vending report in WiMe device 110. Finite state machines 320 of WiMe devices 110 may activate packet processors 330 and packet processors 330 may incorporate the vending reports into TCP packets, which may be sent to vending machine management system 1210. Vending machine 1220-A may send a vending report to vending machine management system 1210 via base station 135-A (signals 1230 and 1232). Vending machine 1220-B may send a vending report to vending machine management system 1210 via base station 135-A (signals 1234 and 1236). Vending machine 1220-C may send a vending report to vending machine management system 1210 via base station 135-B (signals 1238 and 1240).

Each vending machine 1220 may be associated with its own user application 520, and its own application interface memory buffer region in application interface memory buffer 530, in vending machine management system 1210. The received vending reports may be stored by application interface 535 in the corresponding application interface memory buffer region and vending machine management system 1210 may use the corresponding user applications 520 to obtain the vending reports and to compile a combined vending report (signal 1250).

Vending machine 1220 may maintain a stock of each product and memory space 310 of WiMe device 110 may store the current stock of each product. When a particular product runs out, the stock may go to zero and the stock information may be updated in memory space 310. For example, if vending machine 1220-B runs out of stock of a product, the indication that the product is out of stock may be communicated by mirroring the stock of the item from memory space 310 to application interface memory buffer 530 (signals 1252 and 1254). In response, vending machine management system 1210 may alert a stocking vehicle that the product is out of stock in vending machine 1220-B (signal 1256).

Vending machine management system 1210 may update the price of a product by changing the price of the product in application interface memory buffer 530. For example, if the price of a product stocked by vending machines 1220-A and 1220-C changes, user application 520, associated with vending machine 1220-C, may change the price of the product in a memory address of application interface memory buffer 530 where the price is stored. Application interface 535 may copy the price change to WiMe device 110 of vending machine 1220-A (signals 1262 and 1264), and may copy the price change to WiMe device 110 of vending machine 1220-C (signals 1266 and 1268).

As another example system, a user may install a security camera in the user's home. The security camera may include microcontroller 210 and WiMe device 110. The user may configure the security camera to capture images when a motion sensor is activated and to store images in WiMe device 110. Furthermore, the user may configure the security camera to send any captured pictures to an email address associated with the user. Thus, when an image is captured, the image may be stored in WiMe device 110 of the security camera and copied to application interface memory buffer 530. User application 520, associated with the security camera, may then email the captured image from application interface memory buffer 530 to the user's email address.

In other implementations, two WiMe devices 110 may mirror each other's memory spaces 310, additionally to or alternatively to mirroring memory space 310 to application interface memory buffer 530. For example, in the security camera example described above, the user's mobile telephone may include memory space 310 that may mirror memory space 310 of the security camera. Thus, images captured by the security camera may be directly mirrored to the memory space on the user's mobile telephone.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 7-9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A wireless memory device comprising:
   logic configured to mirror a memory space of the wireless memory device in a destination device, wherein the logic is configured to:
      detect that a first set of data has been written by a microcontroller to a first address in the memory space;
      incorporate the first set of data into a first packet, in response to detecting that the first set of data has been written to the memory space;
      incorporate the first address into the first packet to identify an address in a mirrored memory space in the destination device to which the first set of data is to be written;
      provide the first packet to a wireless chipset to wirelessly transmit the first packet to the destination device;
      receive a second packet from the wireless chipset, wherein the second packet was received wirelessly from the destination device;
      retrieve a second memory address from the second packet, wherein the second memory address identifies an address in the mirrored memory space in the destination device to which a second set of data has been written;
      retrieve the second set of data from the second packet; and
      write the second set of data to the retrieved second memory address in the memory space of the wireless memory device.

2. The wireless memory device of claim 1, wherein the logic is further configured to:
   determine whether a chip select line of the wireless memory device is active;
   determine whether a write enable line of the wireless memory device is active, in response to determining that the chip select line is active; and
   set a write flag, in response to determining that the write enable line of the wireless memory device is active.

3. The wireless memory device of claim 2, wherein the logic is further configured to:
   determine a read address, in response to determining that the write enable line of the wireless memory device is not active;
   read a third set of data at the determined read address; and
   provide the read third set of data to the microcontroller.

4. The wireless memory device of claim 2, wherein the logic is further configured to:
   determine whether a write flag has been set, in response to determining that the chip select line of the wireless memory device is not active;
   write the first set of data from a buffer to the first address;
   receive an indication from the wireless chipset that transmission of the first set of data is complete; and
   clear the write flag, in response to receiving the indication from the wireless chipset.

5. The wireless memory device of claim 1, wherein the logic is further configured to:
   activate an interrupt to inform the microcontroller that new data has been received, in response to writing the second set of data to the retrieved second memory address.

6. The wireless memory device of claim 1, wherein the wireless chipset includes a Long Term Evolution chipset.

7. The wireless memory device of claim 1, wherein at least one of the first packet or the second packet includes a Transmission Control Protocol packet.

8. A method, performed by a computer device, the method comprising:
    monitoring, by the computer device, communication from a wireless memory device and from an application interface memory buffer associated with the wireless memory device, wherein the application interface memory buffer minors a memory space of the wireless memory device;
    determining, by the computer device, whether a first packet has been received from the wireless memory device;
    retrieving, by the computer device, a first memory address from the first packet, in response to determining that the first packet has been received, wherein the first memory address identifies an address in the memory space in the wireless memory device at which a first set of data was written;
    retrieving, by the computer device, the first set of data from the first packet;
    storing, by the computer device, the first set of data at the retrieved first memory address of the application interface memory buffer;
    determining, by the computer device, whether a second set of data has been stored at a second address in the application interface memory buffer by an application associated with the wireless memory device;
    generating, by the computer device, a second packet, in response determining that the second set of data has been stored in the application interface memory buffer;
    incorporating, by the computer device, the second address into the second packet to identify an address in the memory space in the wireless memory device to which the second set of data is to be written; and
    sending, by the computer device, the second packet to the wireless memory device.

9. The method of claim 8, further comprising:
    receiving a request to configure a target device associated with the wireless memory device;
    providing a user interface to a user, wherein the user interface enables the user to select one or more configurations for the target device;
    receiving one or more configurations from the user; and
    generating a user application to interact with the target device based on the one or more configurations, wherein the user application is configured to use the application interface memory buffer to communicate with the target device.

10. The method of claim 9, wherein the one or more configurations include:
    a mobile device identifier associated with the wireless memory device; or
    a server device associated with the wireless memory device.

11. The method of claim 9, wherein the one or more configurations include at least one of:
    an instrumentation configuration associated with the target device;
    an automated process configuration associated with the target device;
    a communication configuration associated with the target device; or
    a logs and alarms configuration associated with the target device.

12. The method of claim 9, further comprising:
    obtaining one or more instructions to be executed by a microcontroller associated with the target device;
    storing the obtained one or more instructions in the application interface memory buffer at one or more memory addresses, wherein the one or more memory addresses are accessed by the microcontroller to execute instructions;
    generating a plurality of packets, wherein the plurality of packets include the one or more instructions and the one or more memory addresses; and
    sending the plurality of packets to the wireless memory device.

13. The method of claim 8, wherein sending the second packet to the wireless memory device includes:
    determining a mobile device identifier associated with the wireless memory device;
    establishing a connection with the wireless memory device using the determined mobile device identifier; and
    sending the second packet to the wireless memory device using the established connection.

14. The method of claim 13, wherein the connection includes at least one of:
    an Internet Protocol Multimedia Subsystem session; or
    a Long Term Evolution bearer.

15. A computer device comprising:
    logic configured to:
    monitor communication from a wireless memory device and from an application interface memory buffer associated with the wireless memory device, wherein the application interface memory buffer minors a memory space of the wireless memory device;
    determine whether a first packet has been received from the wireless memory device;
    retrieve a first memory address from the first packet, in response to determining that the first packet has been received, wherein the first memory address identifies an address in the memory space in the wireless memory device at which a first set of data was written;
    retrieve the first set of data from the first packet;
    store the first set of data at the retrieved first memory address of the application interface buffer;
    determine whether a second set of data has been stored at a second address in the application interface memory buffer by an application associated with the wireless memory device;
    generate a second packet, in response determining that the second set of data has been stored in the application interface memory buffer;
    incorporate the second address into the second packet to identify an address in the memory space in the wireless memory device to which the second set of data is to be written; and
    send the second packet to the wireless memory device.

16. The computer device of claim 15, wherein the logic is further configured to:
    receive a request to configure a target device associated with the wireless memory device;
    provide a user interface to a user, wherein the user interface enables the user to select one or more configurations for the target device;
    receive one or more configurations from the user; and
    generate a user application to interact with the target device based on the one or more configurations, wherein the user application is configured to use the application interface memory buffer to communicate with the target device.

17. The computer device of claim 16, wherein the one or more configurations include at least one of:
- a mobile device identifier associated with the wireless memory device;
- information identifying a server device associated with the wireless memory device;
- an instrumentation configuration associated with the target device;
- an automated process configuration associated with the target device;
- a communication configuration associated with the target device; or
- a logs and alarms configuration associated with the target device.

18. The computer device of claim 15, wherein the logic is further configured to:
- obtain one or more instructions to be executed by a microcontroller associated with the target device;
- store the obtained one or more instructions in the application interface memory buffer at one or more memory addresses, wherein the one or more memory addresses are accessed by the microcontroller to execute instructions;
- generate a plurality of packets, wherein the plurality of packets include the one or more instructions and the one or more memory addresses; and
- send the plurality of packets to the wireless memory device.

19. The computer device of claim 15, wherein when the logic is configured to send the second packet to the wireless memory device, the logic is further configured to:
- determine a mobile device identifier associated with the wireless memory device;
- establish a connection with the wireless memory device using the determined mobile device identifier; and
- send the second packet to the wireless memory device using the established connection.

20. The computer device of claim 19, wherein the connection includes at least one of:
- an Internet Protocol Multimedia Subsystem session; or
- a Long Term Evolution bearer.

* * * * *